(12) United States Patent
Nagashima et al.

(10) Patent No.: US 9,453,979 B2
(45) Date of Patent: Sep. 27, 2016

(54) MULTI-CORE OPTICAL FIBER TAPE

(71) Applicant: SUMITOMO ELECTRIC INDUSTRIES, LTD., Osaka-shi, Osaka (JP)

(72) Inventors: Takuji Nagashima, Yokohama (JP); Toshiki Taru, Yokohama (JP); Eisuke Sasaoka, Yokohama (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 14/375,533

(22) PCT Filed: Dec. 26, 2012

(86) PCT No.: PCT/JP2012/083637
§ 371 (c)(1),
(2) Date: Jul. 30, 2014

(87) PCT Pub. No.: WO2013/114770
PCT Pub. Date: Aug. 8, 2013

(65) Prior Publication Data
US 2015/0016791 A1    Jan. 15, 2015

(30) Foreign Application Priority Data
Feb. 1, 2012   (JP) ................. 2012-020059

(51) Int. Cl.
*G02B 6/08*   (2006.01)
*G02B 6/44*   (2006.01)
*G02B 6/02*   (2006.01)

(52) U.S. Cl.
CPC ......... *G02B 6/4403* (2013.01); *G02B 6/02033* (2013.01); *G02B 6/08* (2013.01); *G02B 6/448* (2013.01); *G02B 6/02042* (2013.01)

(58) Field of Classification Search
CPC  G02B 6/02033; G02B 6/02042; G02B 6/08; G02B 6/3885; G02B 6/4403
USPC .................................. 385/114, 120
See application file for complete search history.

(56) References Cited

U.S. PATENT DOCUMENTS

| | | | | |
|---|---|---|---|---|
| 4,420,220 | A * | 12/1983 | Dean et al. ............ | 385/113 |
| 5,524,164 | A * | 6/1996 | Hattori et al. .......... | 385/114 |
| 6,421,487 | B1 * | 7/2002 | Hutton et al. .......... | 385/114 |
| 6,434,305 | B1 * | 8/2002 | Lochkovic et al. .... | 385/114 |

(Continued)

FOREIGN PATENT DOCUMENTS

| | | |
|---|---|---|
| JP | S62-134608 A | 6/1987 |
| JP | S63-208809 A | 8/1988 |

(Continued)

OTHER PUBLICATIONS

Notification of Reasons for Rejection of a corresponding Japanese Patent Application No. 2012-020059, dated Jan. 5, 2016 (3 pages), along with its partial English-language translation.

*Primary Examiner* — Daniel Petkovsek
(74) *Attorney, Agent, or Firm* — Drinker Biddle & Reath LLP

(57) ABSTRACT

A multi-core optical fiber ribbon easily optically connected to another optical component is provided. A multi-core optical fiber ribbon 1 includes a plurality of multi-core optical fibers 10 arranged parallel to one another and a common resin 20, with which the plurality of multi-core optical fibers 10 are collectively coated. A core arrangement direction in which plurality of cores in each of the plurality of multi-core optical fibers 10 are arranged is parallel to or perpendicular to the fiber arrangement direction in which the plurality of multi-core optical fibers 10 are arranged at least at both ends of the multi-core optical fiber ribbon 1.

3 Claims, 11 Drawing Sheets

(56) References Cited

U.S. PATENT DOCUMENTS

| | | | |
|---|---|---|---|
| 6,600,859 B2 * | 7/2003 | Chandraiah et al. ......... 385/114 |
| 6,654,527 B2 * | 11/2003 | Sakabe et al. ................. 385/114 |
| 7,415,181 B2 * | 8/2008 | Greenwood et al. ......... 385/100 |
| 7,471,862 B2 * | 12/2008 | Bringuier ........... G02B 6/02357 |
| | | 385/100 |
| 2011/0229085 A1 | 9/2011 | Bradley et al. |
| 2012/0114292 A1 * | 5/2012 | Hoover ............. C03B 37/01211 |
| | | 385/124 |
| 2013/0322835 A1 | 12/2013 | Butler et al. |

FOREIGN PATENT DOCUMENTS

| | | |
|---|---|---|
| JP | S63-217309 A | 9/1988 |
| JP | H01-156702 A | 6/1989 |
| JP | H01-200310 A | 8/1989 |
| JP | H01-203246 A | 8/1989 |
| JP | H10-104443 A | 4/1998 |
| JP | 2003-344731 A | 12/2003 |
| WO | WO-2011/116137 A1 | 9/2011 |
| WO | WO-2014/042714 A2 | 3/2014 |

* cited by examiner

FIG. 11
(a)
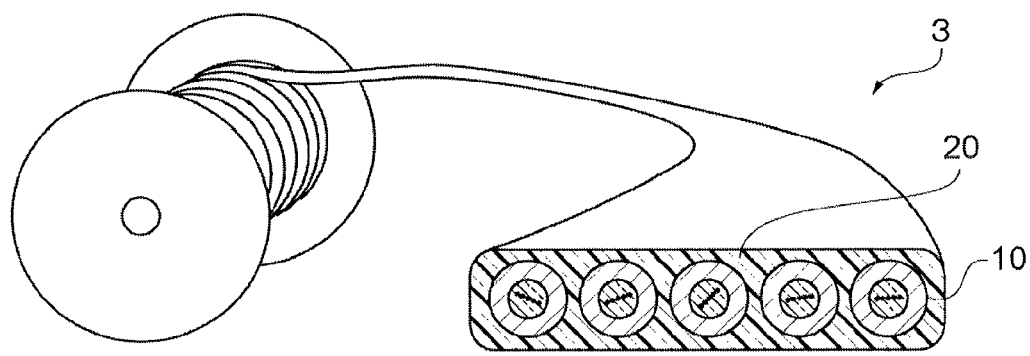
(b)
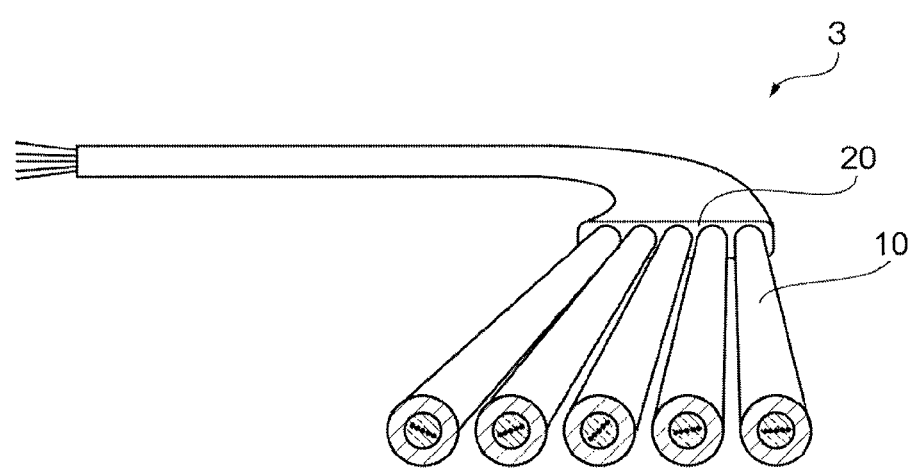
(c)
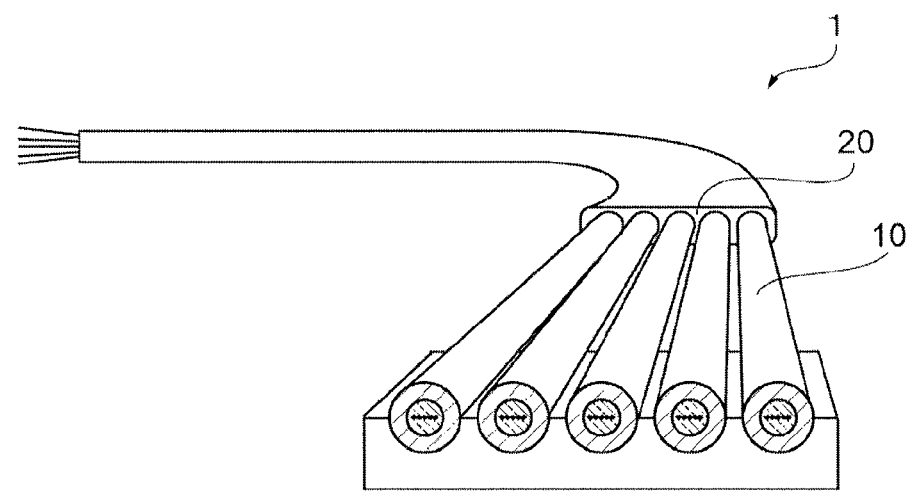

MULTI-CORE OPTICAL FIBER TAPE

TECHNICAL FIELD

The present invention relates to a multi-core optical fiber ribbon.

BACKGROUND ART

Optical fiber ribbons, in which a plurality of single-core optical fibers arranged parallel to one another are collectively coated with a common resin, are known. Such an optical fiber ribbon allows a large amount of information to be transmitted therethrough and is easily handled.

Multi-core optical fibers are also known. In the multi-core optical fibers, a plurality of cores that each extends in the axial direction of the fiber and serves as a high refractive-index component are coated with a common cladding. A multi-core optical fiber ribbon can be produced by collectively coating the plurality of multi-core optical fibers arranged parallel to one another with a common resin. Such a multi-core optical fiber ribbon is expected to allow a larger amount of information to be transmitted therethrough.

SUMMARY OF INVENTION

Technical Problem

An object of the present invention is to provide a multi-core optical fiber ribbon easily optically connected to another optical component. It is also an object of the present invention to provide a method, by which such a multi-core optical fiber ribbon can be easily produced.

Solution to Problem

In order to achieve the above-described task, a multi-core optical fiber ribbon that includes a plurality of multi-core optical fibers arranged parallel to one another and a common resin, with which the plurality of multi-core optical fibers are collectively coated, is provided. Each of the multi-core optical fibers includes a plurality of cores that serve as high refractive-index components and extend in an axial direction, a common cladding covering the plurality of cores, and a fiber coating over the cladding. In the multi-core optical fiber ribbon, a core arrangement direction in which the plurality of cores in each of the plurality of multi-core optical fibers are arranged is parallel to or perpendicular to a fiber arrangement direction in which the plurality of multi-core optical fibers are arranged at least at both ends of the multi-core optical fiber ribbon.

In the multi-core optical fiber ribbon according to the present invention, the core arrangement direction of each of the plurality of multi-core optical fibers may be parallel to the fiber arrangement direction at least at both the ends of the multi-core optical fiber ribbon. In each of the plurality of multi-core optical fibers, let X (µm) be a distance between a central axis and the core disposed at a furthest position, an angular shift of the core arrangement direction from a direction parallel to or perpendicular to the fiber arrangement direction may be equal to or smaller than 2.3×40/X) (°). Furthermore, a connector may be provided at least at one of the ends of the multi-core optical fiber ribbon.

A method of producing a multi-core optical fiber ribbon is a method of producing the multi-core optical fiber ribbon according to the present invention. A first embodiment of the method includes the steps of collectively coating the plurality of multi-core optical fibers with the common resin, and after the collective coating, adjusting an orientation of each of the plurality of multi-core optical fibers while observing end surfaces of the multi-core optical fiber at both end surfaces of the multi-core optical fiber ribbon.

A second embodiment includes the steps of preparing the plurality of multi-core optical fibers, in each of which a difference between a major axis and a minor axis is equal to or greater than 1 µm in a coating section or a cladding section, and adjusting an orientation of each of the plurality of multi-core optical fibers with reference to orientations of the major axis and the minor axis.

A third embodiment includes the steps of causing each of the plurality of multi-core optical fibers to exhibit fiber curl having a radius of curvature of equal to or smaller than 4 m, and adjusting an orientation of each of the plurality of multi-core optical fibers with reference to an orientation of the fiber curl. In this case, in each of the plurality of multicore optical fibers, a stress applying part may be provided in the cladding so as to cause the fiber curl in the multi-core optical fiber.

Advantageous Effects of Invention

According to the present invention, a multi-core optical fiber ribbon easily optically connected to another optical component can be provided.

BRIEF DESCRIPTION OF DRAWINGS

FIG. 11 includes conceptual views illustrating an example of the method of producing the multi-core optical fiber ribbon.

DESCRIPTION OF EMBODIMENTS

An embodiment according to the present invention will be described in detail below with reference to the accompanying drawings. In description of the drawings, the same elements are denoted by the identical reference symbols and redundant description thereof is omitted.

Figure 1:
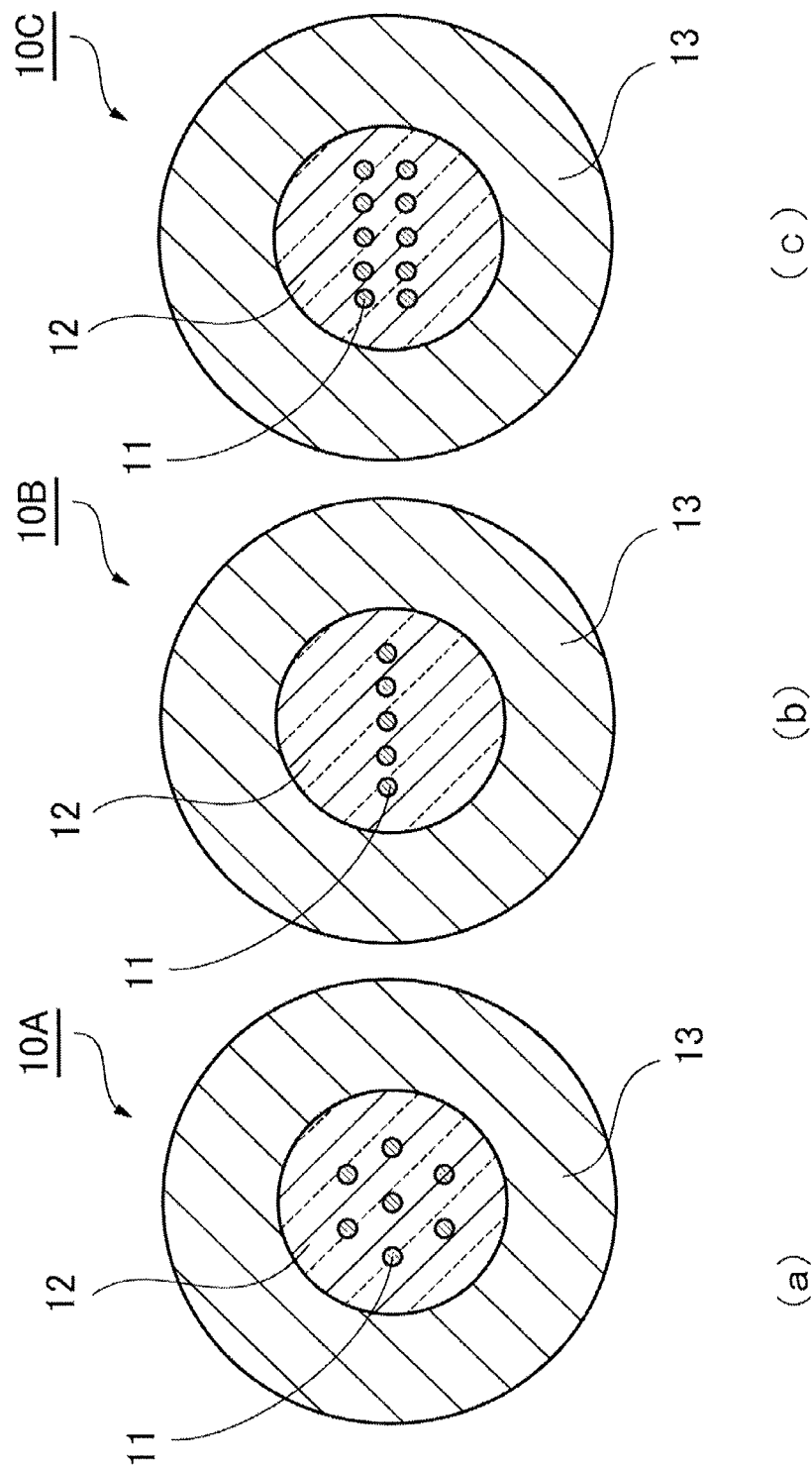
FIG. 1 includes sectional views (a), (b), and (c) each illustrating an example of the structure of a multi-core optical fiber.

In FIG. 1, views (a), (b), and (c) are sectional views each illustrating an example of the structure of a multi-core optical fiber. A multi-core optical fiber 10A illustrated in view (a) includes seven cores 11, a cladding 12, and a fiber coating 13. The cores 11 extending in the fiber axis direction serve as high refractive-index components and coated with the common cladding 12 and the fiber coating 13 in this order. Six of the core 11 are equally spaced apart from one another on a circumference of a circle centered at the other one of the core 11 in sectional view. A multi-core optical fiber 10B illustrated in view (b) includes five cores 11, the cladding 12, and the fiber coating 13. The cores 11 extending in the fiber axis direction serve as high refractive-index components and coated with the common cladding 12 and the fiber coating 13 in this order. Five cores 11 are arranged in a row and equally spaced apart from one another in sectional view.

A multi-core optical fiber 10C illustrated in view (c) includes ten cores 11, the cladding 12, and the fiber coating 13. The cores 11 extending in the fiber axis direction serve as high refractive-index components and coated with the common cladding 12 and the fiber coating 13 in this order. Ten cores 11 are arranged in a two-by-five array and equally spaced apart from one another in sectional view. In each of the multi-core optical fibers 10A, 10B, and 10C, the cores 11 and the cladding 12 are formed of silica glass, the refractive index of the cores 11 is higher than that of the cladding 12, and the cores 11 can guide light.

A multi-core optical fiber ribbon according to the present invention includes such multi-core optical fibers. Alternatively, the multi-core optical fiber ribbon according to the present invention may include multi-core optical fibers having another structure, in which the number and arrangement of the cores are different from those of the above-described multi-core optical fibers.

Figure 2:
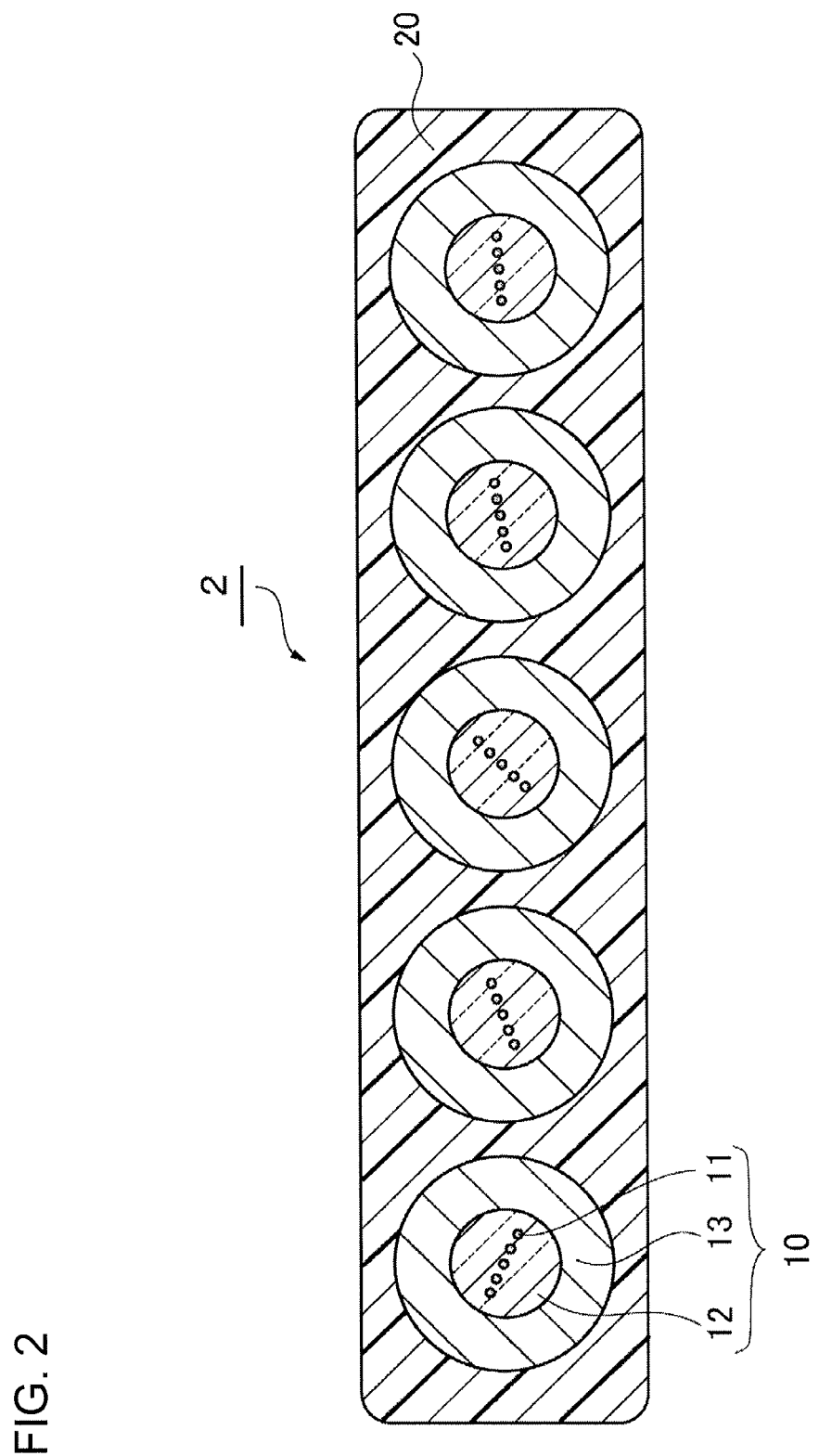
FIG. 2 is a sectional view of a comparative example of a multi-core optical fiber ribbon.

FIG. 2 is a sectional view of a comparative example of a multi-core optical fiber ribbon 2. In the multi-core optical fiber ribbon 2, five multi-core optical fibers 10 arranged parallel to one another are collectively coated with a common resin 20. The cores in the multi-core optical fibers 10 are arranged in different directions from fiber to fiber. Thus, it is difficult for the multi-core optical fiber ribbon 2 to be optically connected to another optical component or there is a large connection loss when the multi-core optical fiber ribbon 2 is connected to the other optical component.

Figure 3:
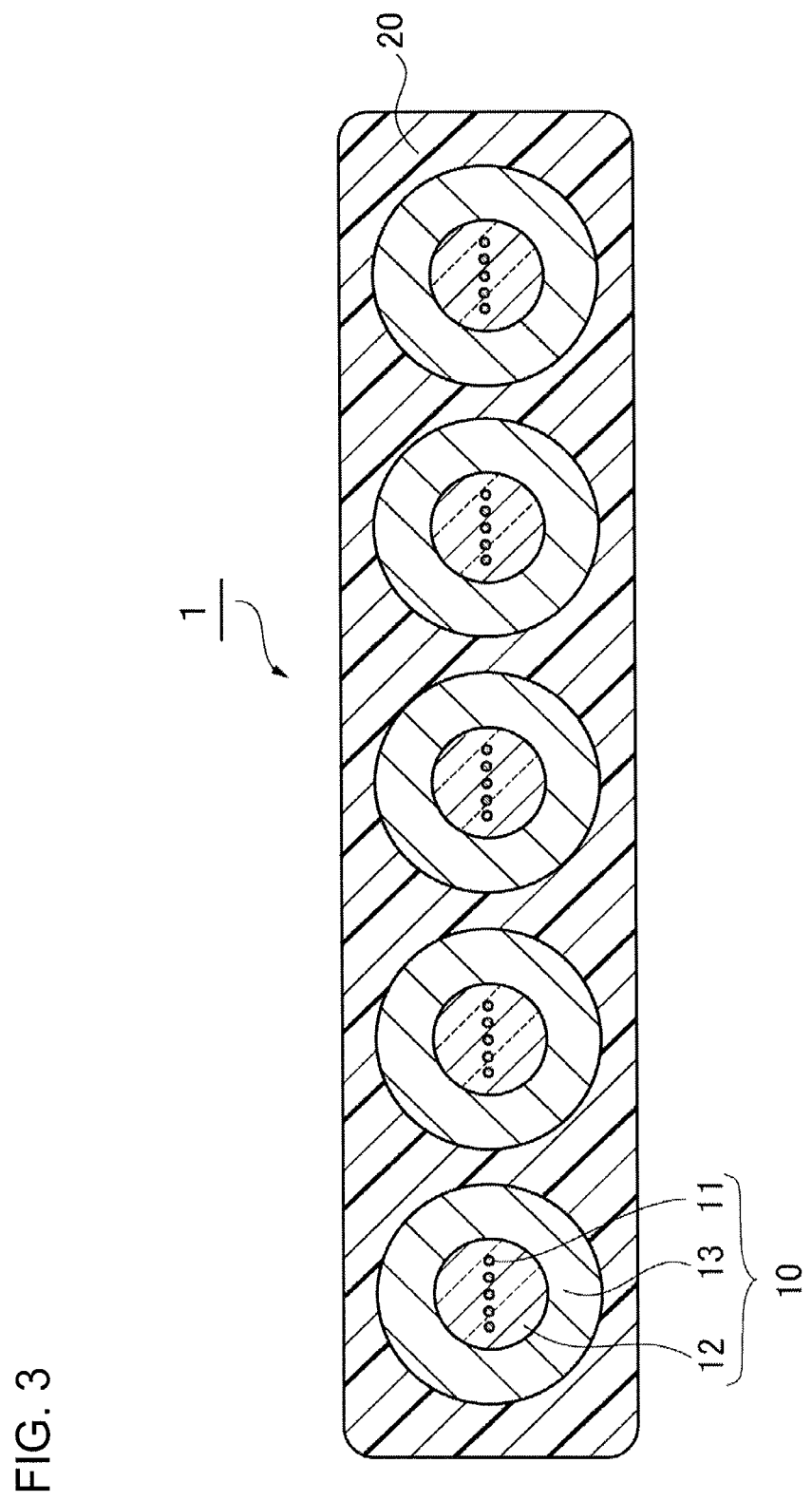
FIG. 3 is a sectional view of a multi-core optical fiber ribbon according to an embodiment of the present invention.

FIG. 3 is a sectional view of a multi-core optical fiber ribbon 1 according to an embodiment of the present invention. In the multi-core optical fiber ribbon 1, five multi-core optical fibers 10 arranged parallel to one another are collectively coated with the common resin 20. The core arrangement directions of the multi-core optical fibers 10 are parallel to a fiber arrangement direction. Thus, it is easy for the multi-core optical fiber ribbon 1 to be optically connected to another optical component and there is a small connection loss when the multi-core optical fiber ribbon 1 is connected to the other optical component.

The multi-core optical fibers 10 may have the structures illustrated in views (a) to (c) of FIG. 1, or structures other than any of those illustrated views (a) to (c) of FIG. 1. The "core arrangement direction" is defined as a direction of a row in which the number of cores arranged is largest in the section of the multi-core optical fiber 10. In views (b) and (c) of FIG. 1, the "core arrangement direction or directions" extend in the left-right direction. In view (a) of FIG. 1, three "core arrangement directions" exist. The core arrangement direction or directions of the multi-core optical fibers 10 may be "perpendicular to the fiber arrangement direction" instead of "parallel to the fiber arrangement direction".

It is sufficient that the core arrangement directions of the multi-core optical fibers 10 be parallel to or perpendicular to the fiber arrangement direction at both ends of the multi-core optical fiber ribbon 1. The core arrangement directions of the multi-core optical fibers 10 are not necessarily parallel to or perpendicular to the fiber arrangement direction in a middle portion at other than both the ends of the multi-core optical fiber ribbon 1.

In each of the multi-core optical fibers 10 of the multi-core optical fiber ribbon 1, let X (μm) be the distance between the central axis of the multi-core optical fiber 10 and the core disposed at the furthest position, it is preferable that an angular shift of the core arrangement direction from the direction parallel to or perpendicular to the fiber arrangement direction be equal to or smaller than 2.3×40/X (°). For example, it is preferable that, when X=40 μm, the angular shift of the core arrangement direction from the direction parallel to or perpendicular to the fiber arrangement direction be equal to or smaller than 2.3°. With this setting, the connection loss caused by the angular shift can be limited to 0.5 dB or smaller. Here, the mode field diameter (MFD) is set to 9.5 μm, which is equal to the upper limit of the range of the nominal MFD in accordance with the International Telecommunication Union Telecommunication Standardization Sector (ITU-T) recommendation G.652.

It is also preferable that a connector be provided at least at one of the ends of the multi-core optical fiber ribbon 1. In this case, the multi-core optical fiber ribbon 1 is easily optically connected to another optical component.

FIG. 11 includes conceptual views illustrating an example of a method of producing the multi-core optical fiber ribbon 1. Initially, a plurality of multi-core optical fibers 10 are arranged parallel to one another. The arranged multi-core optical fibers 10 are collectively coated with the common resin 20, thereby an assembly 3 (view (a)) is formed. Next, the assembly 3 is cut to a desired length, and the common resin 20 is removed from the cut end of the assembly 3 so that the plurality of multi-core optical fibers 10 are exposed (view (b)). After that, the orientations (rotation orientations about the central axis) of the multi-core optical fibers 10 are adjusted and secured while observing the end surfaces of the plurality of multi-core optical fibers 10 having been exposed (view (c)). Also at the other end, the common resin 20 is removed so that the plurality of multi-core optical fibers 10 are exposed, and the orientations of the multi-core optical fibers 10 are adjusted and secured while observing the end surfaces of the plurality of multi-core optical fibers 10 having been exposed. Thus, the multi-core optical fiber ribbon 1, in which the core arrangement directions of the multi-core optical fibers are parallel to or perpendicular to the fiber arrangement direction at least at both the ends, can be produced.

Figure 4:
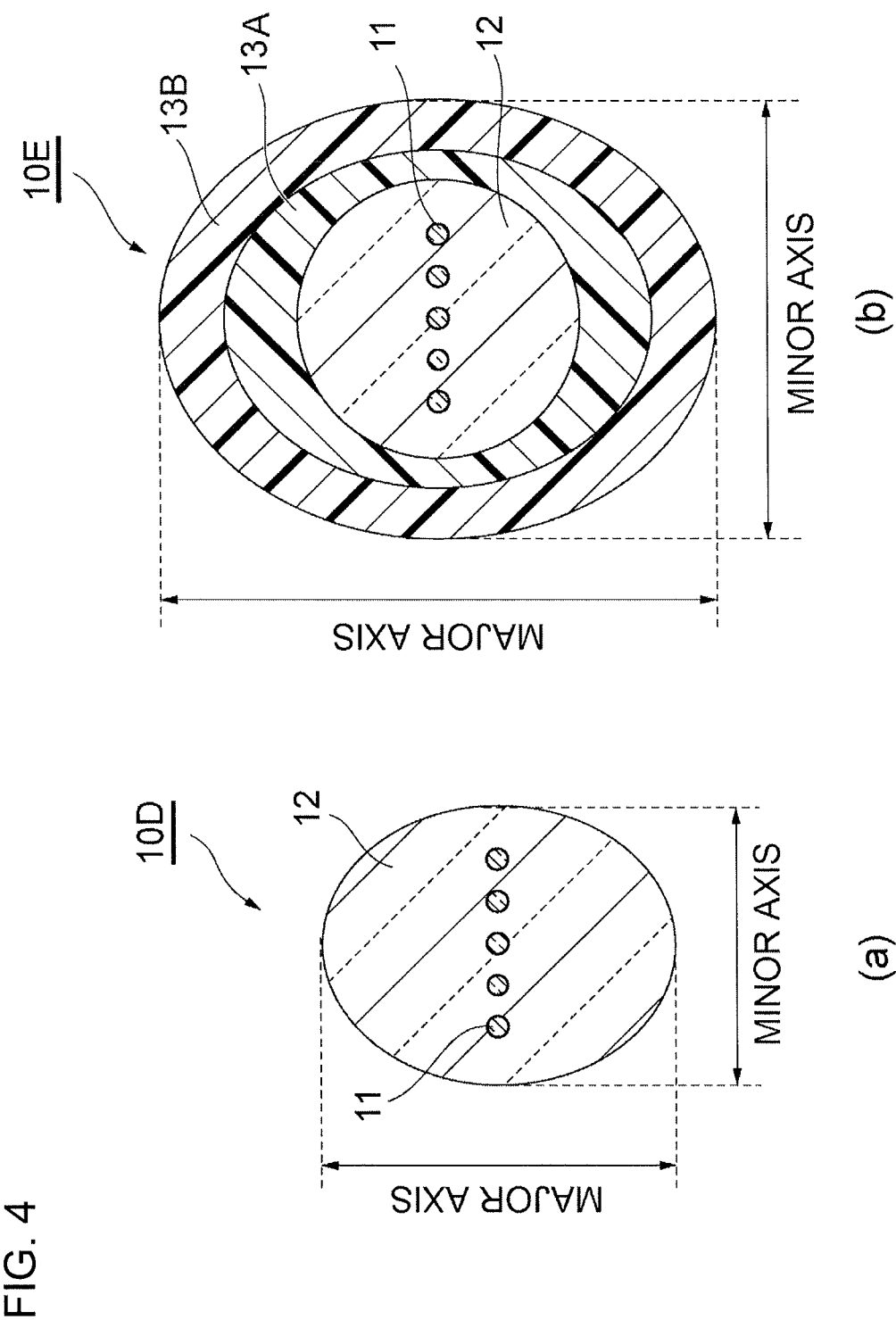
FIG. 4 includes sectional views (a) and (b) each illustrating an example of the structure of a multi-core optical fiber.

Alternatively, the multi-core optical fiber ribbon 1 may be produced by, for example, the following method. In this production method, either of a multi-core optical fiber 10D having a structure as illustrated in view (a) of FIG. 4 and a multi-core optical fiber 10E having a structure as illustrated in view (b) of FIG. 4 is used. The multi-core optical fiber 10D includes the cladding 12 having a non-circular section and the plurality of cores 11 arranged in the minor axis direction. The multi-core optical fiber 10E includes a first coating resin layer 13A and a second coating resin layer 13B around the cladding 12. The second coating resin layer 13B has a non-circular section. The plurality of cores 11 are arranged in the minor axis direction. Japanese Unexamined Patent Application Publications No. 1-203246, No. 1-200310, and No. 63-208809 disclose an optical fiber that includes a coating resin layer or a cladding that has a non-circular section.

When arranging the plurality of multi-core optical fibers 10D or 10E parallel to one another, by adjusting the non-circular sections to be uniform in orientation with reference to the major and minor axes of the multi-core optical fibers, the multi-core optical fiber ribbon can be produced. For reliably adjusting the non-circular sections to be uniform in orientation, it is preferable that the difference between the major and minor axes of the non-circular shapes be equal to or greater than 1 µm. The core arrangement direction may be the major axis direction or the minor axis direction, or a direction specified relative to the major axis direction or the minor axis direction.

Figure 5:
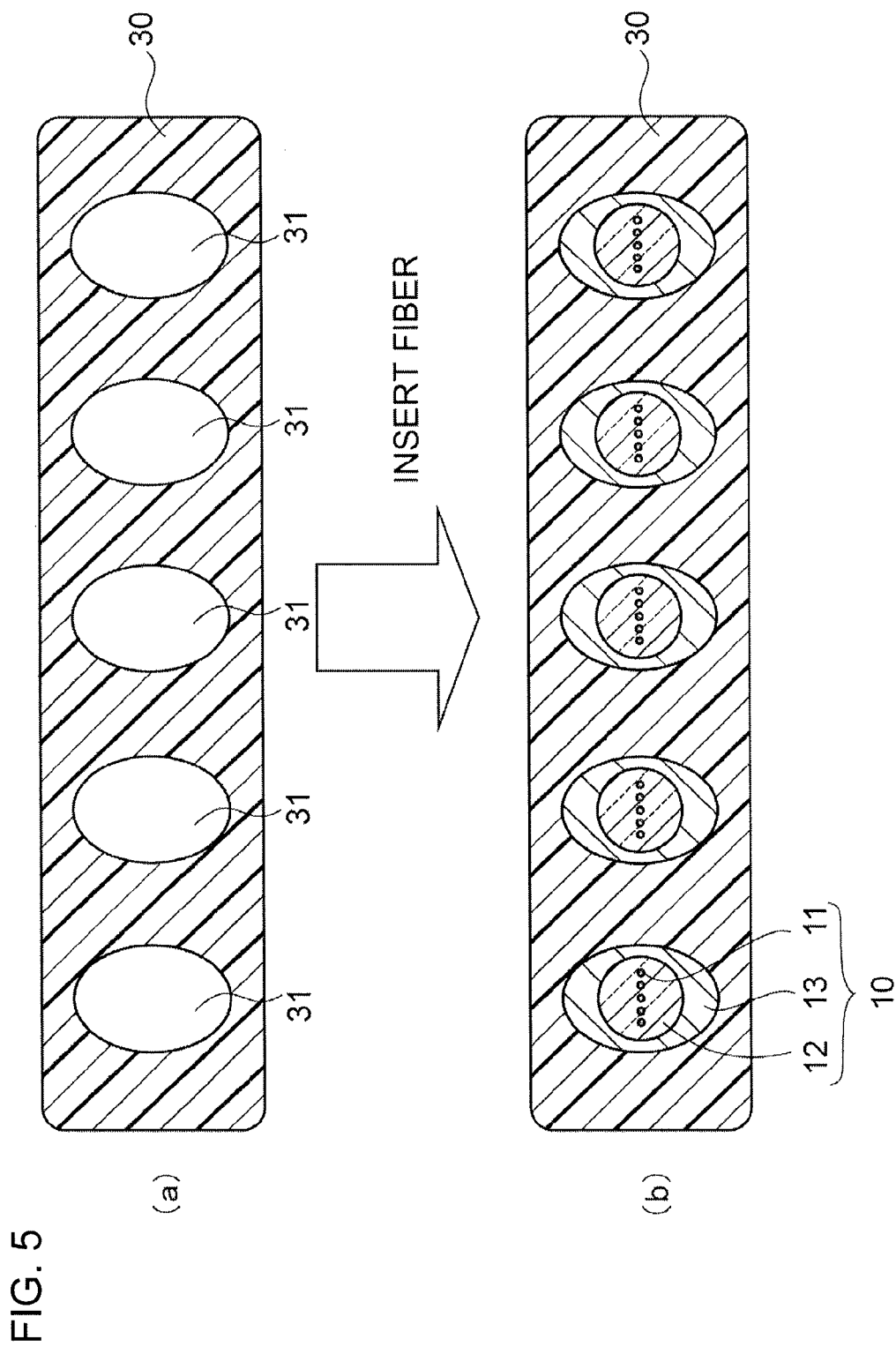
FIG. 5 includes conceptual views illustrating a first example of a method of producing the multi-core optical fiber ribbon according to the present invention.

The core arrangement directions of the multi-core optical fibers 10, which each include the coating resin layer or the cladding that has a non-circular section, may be aligned with one another at the ends of the ribbon as follows: as illustrated in view (a) of FIG. 5, a connector 30 is prepared. The connector 30 has a plurality of through holes 31, which have the same shape as that of the non-circular section of the multi-core optical fiber 10 and the major and minor axis directions of which are adjusted to be uniform in direction; and as illustrated in view (b) of FIG. 5, the multi-core optical fibers 10 are inserted into the through holes 31 of the connector 30.

Figure 6:
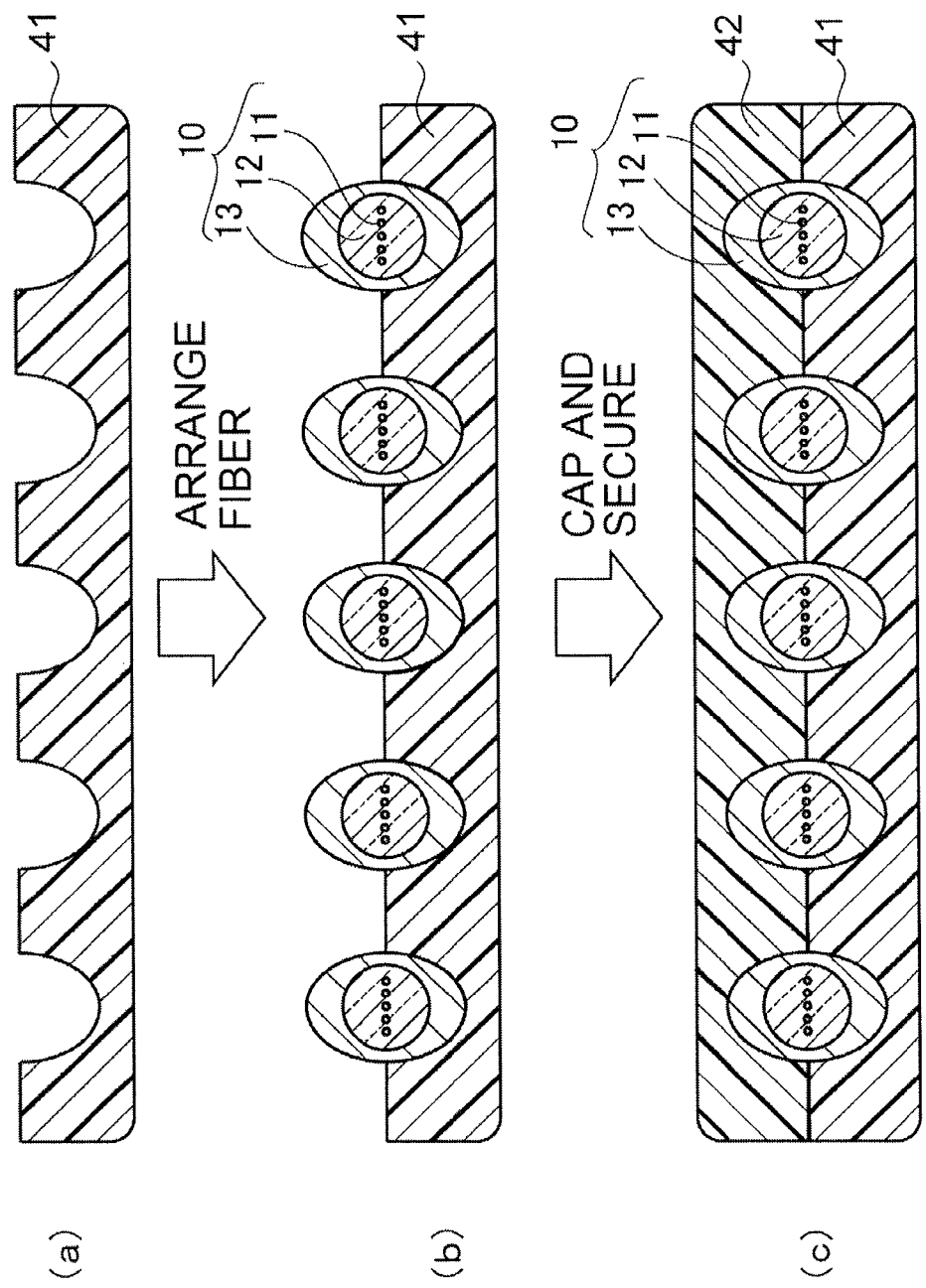
FIG. 6 includes conceptual views illustrating a second example of the method of producing the multi-core optical fiber ribbon according to the present invention.

Alternatively, the following method may be used: as illustrated in view (a) of FIG. 6, a U-groove member 41 having a plurality of U-shaped grooves are prepared; as illustrated in view (b) of FIG. 6, the multi-core optical fibers 10 are disposed in the U-shaped grooves of the U-groove member 41; and as illustrated in view (c) of FIG. 6, a U-groove member 42 is disposed on and secured to the U-groove member 41 with the multi-core optical fibers 10 interposed therebetween.

Figure 7:
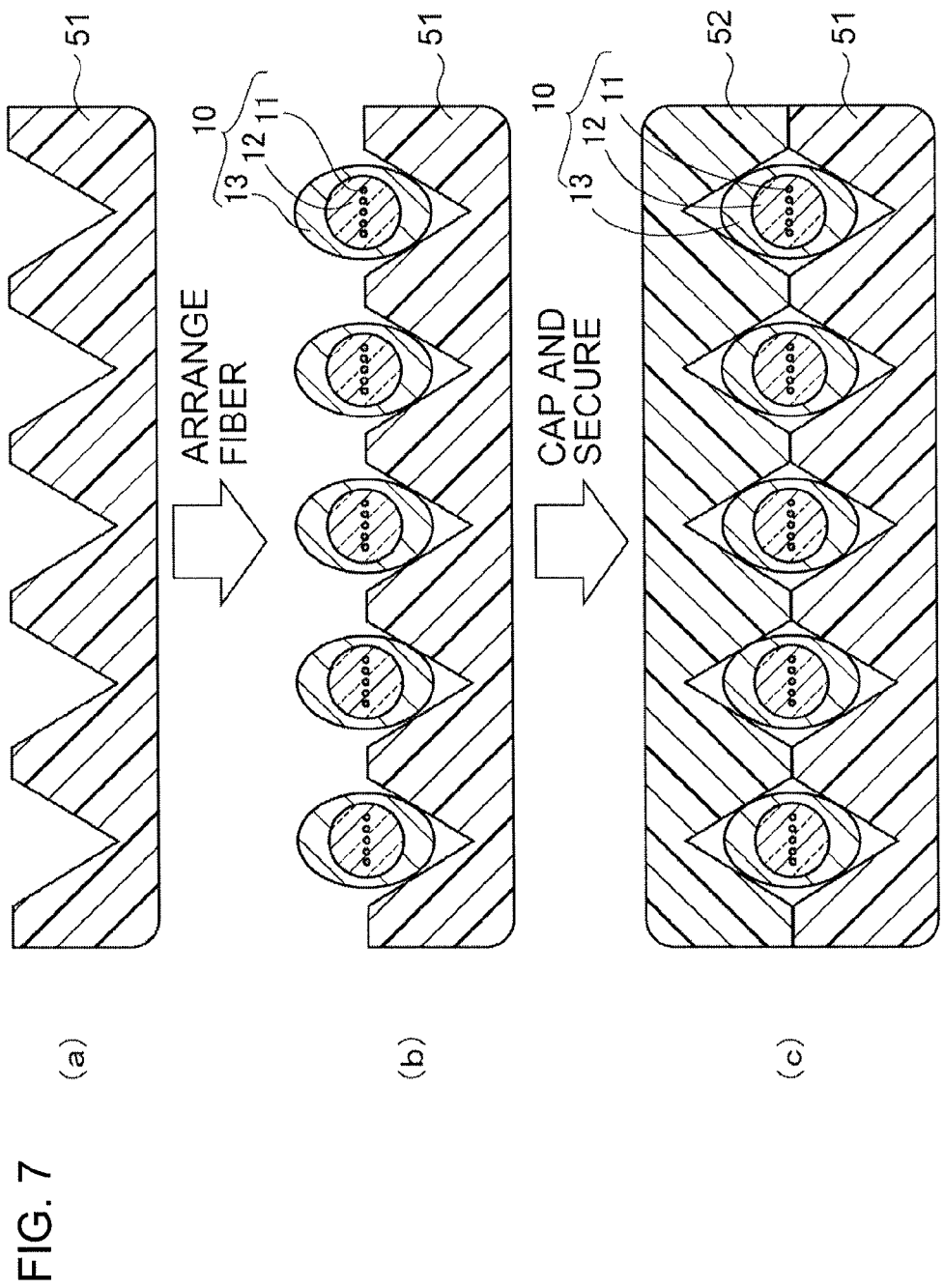
FIG. 7 includes conceptual views illustrating a third example of the method of producing the multi-core optical fiber ribbon according to the present invention.

Alternatively, the following method may be used: as illustrated in view (a) of FIG. 7, a V-groove member 51 having a plurality of V-shaped grooves are prepared; as illustrated in view (b) of FIG. 7, the multi-core optical fibers 10 are disposed in the V-shaped grooves of the V-groove member 51; and as illustrated in view (c) of FIG. 7, a V-groove member 52 is disposed on and secured to the V-groove member 51 with the multi-core optical fibers 10 interposed therebetween.

Figure 8:
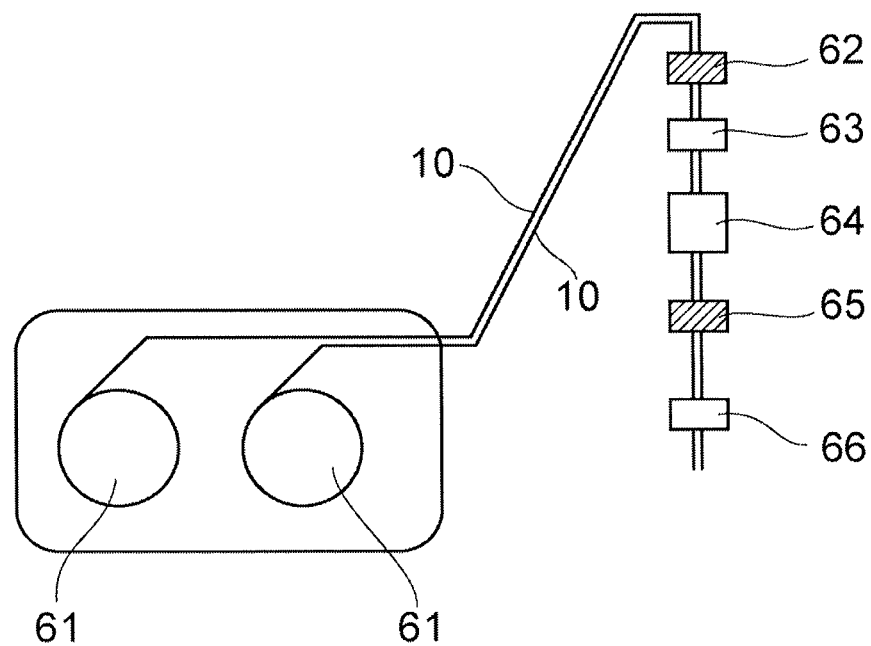
FIG. 8 is a conceptual view illustrating a fourth example of the method of producing the multi-core optical fiber ribbon according to the present invention.
Figure 9:
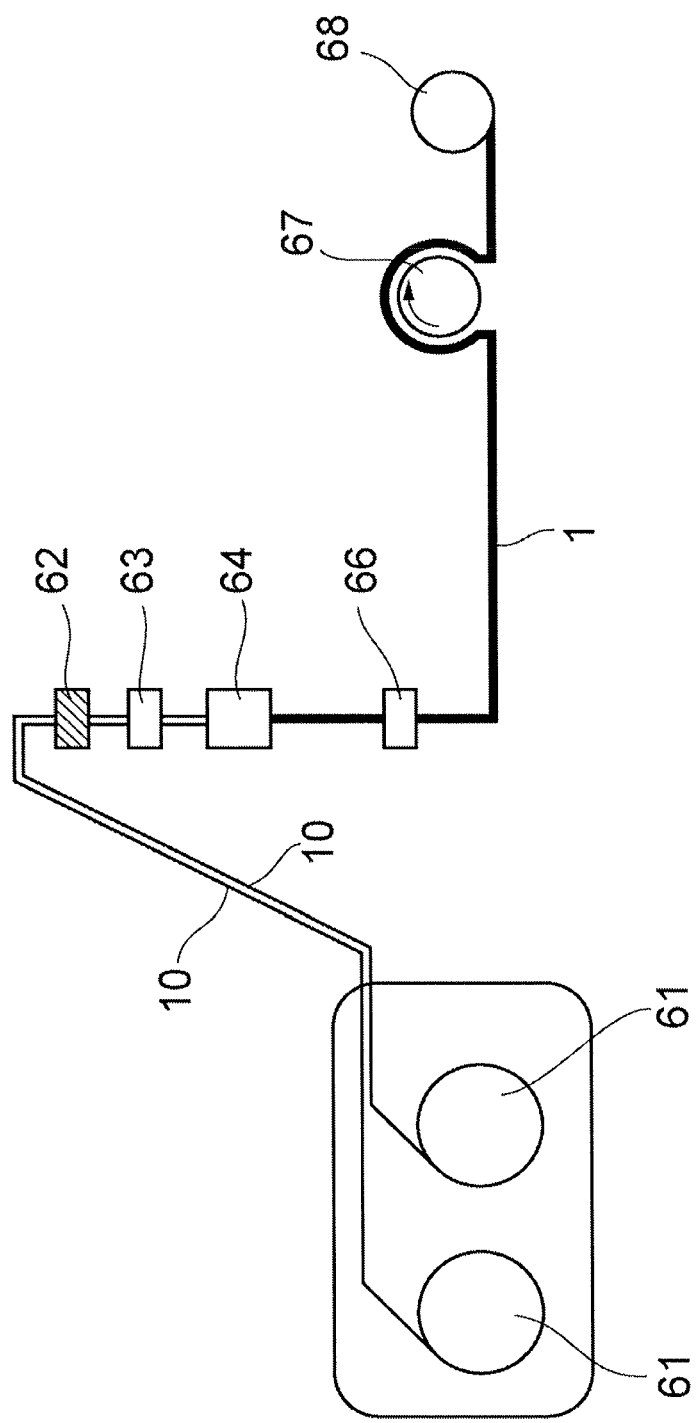
FIG. 9 is a conceptual view illustrating the fourth example of the method of producing the multi-core optical fiber ribbon according to the present invention.

The core arrangement directions of the multi-core optical fibers 10, which each include the coating resin layer or the cladding that has a non-circular section, may be aligned with one another through the entire length of the ribbon by a method illustrated in FIGS. 8 and 9. That is, at an initial stage of the production, as illustrated in FIG. 8, by using a first guide 62 and a second guide 65, the non-circular sections of the claddings or the coating resin layers of the multi-core optical fibers 10 are adjusted to be uniform in orientation and parts of the claddings or the coating resin layers are secured. Here, the multi-core optical fibers 10 are fed from the pay-off bobbins 61, the first guide 62 is provided upstream of a coating device 63, and the second guide 65 is provided downstream of a curing device 64. With the claddings or the coating resin layers set in this state, resin coating with the coating device 63 and resin curing with the curing device 64 are started.

Then, as illustrated in FIG. 9, when the parts of the multi-core optical fibers 10 have been secured by a collective ribbon coating, the second guide 65 is removed and the multi-core optical fiber ribbon 1, the resin component of which has been cured with the curing device 64, is wound on a take-up bobbin 68 through a capstan 67. When securing the parts of the multi-core optical fibers 10, it is preferable that a tension of equal to or greater than 200 gf be applied to each of the multi-core optical fibers 10 by a tension applying device 66 so as to stabilize the orientations of the multi-core optical fibers 10.

In order to align the core arrangement directions of the multi-core optical fibers 10 with one another, fiber curl may be utilized. That is, the multi-core optical fiber ribbon can be produced by causing each of the plurality of multi-core optical fibers to exhibit fiber curl and adjusting the orientations of the multi-core optical fibers with reference to the orientations of the fiber curl. Fiber curl is caused due to asymmetry of stress in the radial direction remaining in an optical fiber. The size of fiber curl is typically evaluated by the radius of curvature of an arc formed by an optical fiber, the coating of which has been removed.

Figure 10:
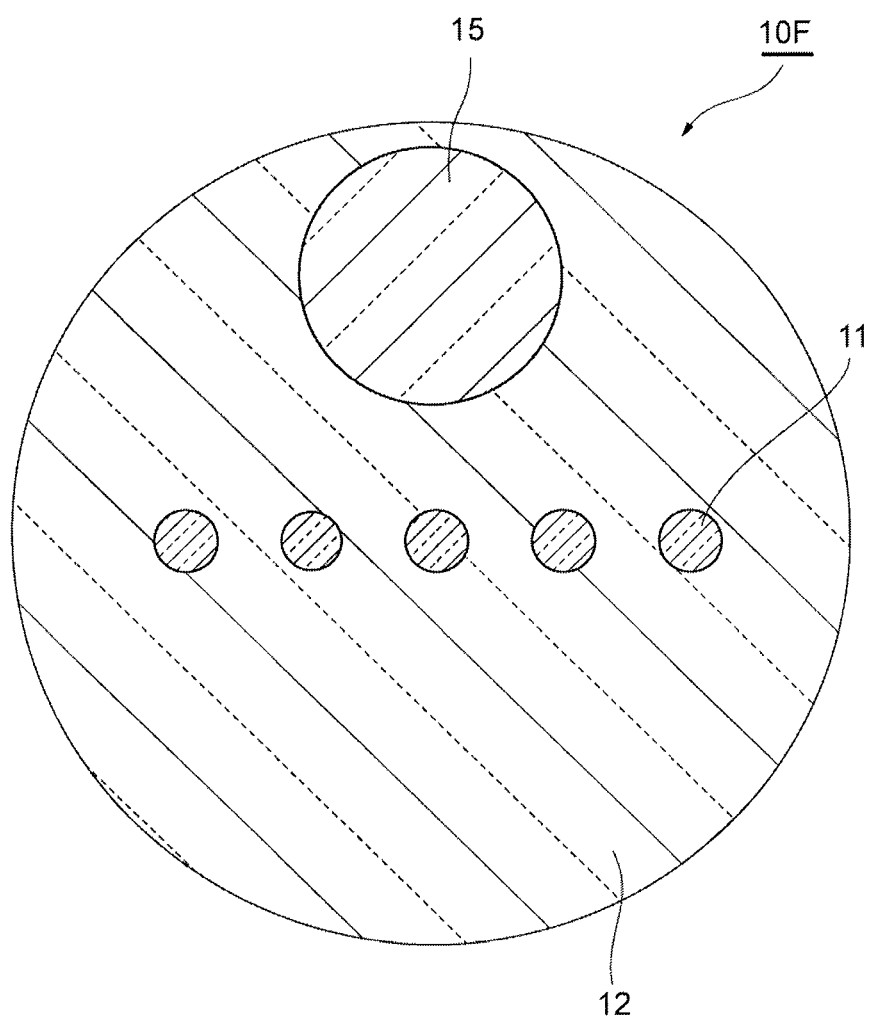
FIG. 10 is a sectional view illustrating an example of the structure of the multi-core optical fiber.

As illustrated in FIG. 10, fiber curl is caused in a multi-core optical fiber 10F by providing a stress applying part 15 in the cladding 12. Fiber curl is not caused in the left-right direction because of left-right symmetry of the multi-core optical fiber 10F and caused in the top-bottom direction because of top-bottom asymmetry of the multi-core optical fiber 10F. Thus, the core arrangement direction can be recognized in accordance with the direction of the fiber curl.

It is preferable that the stress applying part 15 use a material having a thermal expansion coefficient significantly different from that of the cladding 12. It is also preferable that the stress applying part 15 be provided near the outer circumference of the cladding 12. In order to apply stress, a hole that extends in the longitudinal direction of the fiber may be used. Although it is not intentionally designed, fiber curl having the radius of curvature of equal to or greater than 4 m may be caused in general-purpose optical fibers. Thus, in order to allow unintended fiber curl to be distinguished from intended fiber curl, it is preferable that the intentional fiber curl in the present embodiment have the radius of curvature of equal to or smaller than 4 m. An optical fiber, in which fiber curl is intentionally caused, is disclosed in Japanese Unexamined Patent Application Publications No. 63-217309 and No. 1-156702.

The invention claimed is:

1. A method of producing a multi-core optical fiber ribbon comprising a plurality of multi-core optical fibers arranged parallel to one another, the multi-core optical fibers each including a plurality of cores that serve as high refractive-index components and extend in an axial direction, a common cladding covering the plurality of cores, and a fiber coating over the cladding; and
   a common resin collectively coating the plurality of multi-core optical fibers, the method comprising the steps of:
   causing each of the plurality of multi-core optical fibers to exhibit fiber curl having a radius of curvature of equal to or smaller than 4 m, and
   adjusting an orientation of each of the plurality of multi-core optical fibers with reference to the orientation of the fiber curl such that a core arrangement direction in which the plurality of cores in each of the plurality of multi-core optical fibers are arranged, is parallel to or perpendicular to a fiber arrangement direction in which the plurality of multi-core optical fibers are arranged at least at both ends of the multi-core optical fiber ribbon.

2. The method of producing the multi-core optical fiber ribbon according to claim 1, wherein, in each of the plurality of multicore optical fibers, a stress applying part is provided in the common cladding so as to cause the fiber curl in the multi-core optical fiber.

3. The method of producing the multi-core optical fiber ribbon according to claim 1, further comprising
providing a connector at least at one of the ends of the multi-core fiber ribbon.

* * * * *